(12) United States Patent
Klaiber et al.

(10) Patent No.: US 12,247,677 B2
(45) Date of Patent: Mar. 11, 2025

(54) METHOD OF DIAGNOSING A VALVE, DIAGNOSIS MODULE, AND VALVE

(71) Applicant: Buerkert Werke Gmbh & Co. KG, Ingelfingen (DE)

(72) Inventors: Markus Klaiber, Ingelfingen (DE); Holger Schwab, Ingelfingen (DE); Florian Fischer, Ingelfingen (DE)

(73) Assignee: BUERKERT WERKE GMBH & CO. KG (DE)

( * ) Notice: Subject to any disclaimer, the term of this patent is extended or adjusted under 35 U.S.C. 154(b) by 432 days.

(21) Appl. No.: 17/556,726

(22) Filed: Dec. 20, 2021

(65) Prior Publication Data

US 2022/0196184 A1    Jun. 23, 2022

(30) Foreign Application Priority Data

Dec. 21, 2020    (DE) .................. 10 2020 134 425.2

(51) Int. Cl.
| | |
|---|---|
| F16K 37/00 | (2006.01) |
| F16K 31/06 | (2006.01) |
| G01M 7/02 | (2006.01) |
| G01M 7/04 | (2006.01) |
| G01M 7/06 | (2006.01) |
| G01N 3/36 | (2006.01) |

(52) U.S. Cl.
CPC ......... *F16K 37/0041* (2013.01); *F16K 31/06* (2013.01); *G01M 7/022* (2013.01); *G01M 7/04* (2013.01); *G01M 7/06* (2013.01); *G01N 3/36* (2013.01); *G01N 2203/0048* (2013.01)

(58) Field of Classification Search
CPC ...... F16K 37/0041; F16K 31/06; G01M 7/04; G01M 7/06; G01M 7/022; G01N 3/36; G01N 2203/0048
USPC ........................................... 73/665
See application file for complete search history.

(56) References Cited

U.S. PATENT DOCUMENTS

| | | | | |
|---|---|---|---|---|
| 8,019,569 | B2 * | 9/2011 | Bolz | F02D 41/20 |
| | | | | 73/1.72 |
| 10,563,545 | B2 * | 2/2020 | Zhang | F02D 41/2409 |
| 2007/0090315 | A1 * | 4/2007 | Bolz | F02D 41/221 |
| | | | | 251/129.04 |
| 2015/0069860 | A1 * | 3/2015 | Reiter | F04B 43/043 |
| | | | | 251/129.01 |

(Continued)

FOREIGN PATENT DOCUMENTS

| | | | | |
|---|---|---|---|---|
| CN | 114645968 A | * | 6/2022 | ............ F16K 31/06 |
| CN | 116696875 A | * | 9/2023 | ......... F16K 37/0041 |

(Continued)

*Primary Examiner* — Stephanie E Bloss
*Assistant Examiner* — Kevin C Butler
(74) *Attorney, Agent, or Firm* — Dilworth IP, LLC

(57) ABSTRACT

A method of diagnosing a valve is described, which has an electrodynamic actuator, which includes a coil, a movable magnet arrangement for generating a magnetic field, and a movable control element which is coupled to the movably arranged magnet arrangement. At least one electrical variable of the electrodynamic actuator is measured. The electrical variable is evaluated with respect to a reference variable to determine at least one induction-dependent valve variable which is assigned to the motion profile of the electrodynamic actuator. A diagnosis module and a valve are furthermore described.

15 Claims, 7 Drawing Sheets

(56) References Cited

U.S. PATENT DOCUMENTS

| | | | |
|---|---|---|---|
| 2019/0316496 A1* | 10/2019 | Zhang | F02D 41/009 |
| 2020/0292618 A1* | 9/2020 | Maucher | G01M 17/00 |
| 2022/0196184 A1* | 6/2022 | Klaiber | F16K 31/06 |
| 2023/0279965 A1* | 9/2023 | Neumair | H01F 7/1844 |
| | | | 251/129.15 |

FOREIGN PATENT DOCUMENTS

| | | | | |
|---|---|---|---|---|
| DE | 102005050338 A1 * | 5/2007 | | F02D 41/20 |
| DE | 102009054400 A1 * | 8/2011 | | B60R 25/00 |
| DE | 102013110029 A1 * | 3/2015 | | F04B 19/006 |
| DE | 102013110029 C5 | 3/2017 | | |
| DE | 102019109078 A1 | 10/2019 | | |
| DE | 102019203421 A1 * | 9/2020 | | B60T 17/22 |
| DE | 102020119898 B3 * | 12/2021 | | F16K 37/0083 |
| EP | 1777400 A2 * | 4/2007 | | F02D 41/20 |

* cited by examiner

METHOD OF DIAGNOSING A VALVE, DIAGNOSIS MODULE, AND VALVE

FIELD OF THE DISCLOSURE

Embodiments of the present disclosure relate to a method of diagnosing a valve having an electrodynamic actuator. Furthermore, embodiments of the present disclosure relate relates to a diagnosis module for a valve having an electrodynamic actuator, and to a valve.

BACKGROUND

In fluid technology, valves which have an electrodynamic actuator are typically used. In known electromagnetic actuators, an armature made of a magnetic material is moved by a magnetic field generated by a coil, which changes the position of the valve. Particularly in case of a miniaturization of the valves, the possibilities of designing so as to save space, on the one hand, and of providing sufficient magnetic force, on the other hand, are limited. This is due to the fact that in case of a small coil, the magnetic field intensity which can be achieved decreases considerably or the maximum possible current is correspondingly limited.

In contrast to the known electromagnetic actuators, the magnetic field intensity in electrodynamic actuators depends on the volume of the permanent magnets of the magnet arrangement used in the actuator. A reduction of the volume of the permanent magnets of the magnet arrangement has a comparatively smaller effect on the available magnetic field intensity than the reduction of the coil size in an electromagnetic actuator. Therefore, with electrodynamic actuators, correspondingly high magnetic forces can be generated even with small space sizes or miniaturizations of the valves. Such an electrodynamic actuator is known, for example, from DE 10 2013 110 029 C5.

The electrodynamic actuators are typically used in valves in which little space is available. In this respect, it is not possible in these valves, either, to provide a sensor system via which the state of the valve can be monitored or appropriate diagnostic functions of the valve can be carried out. The sensors known from the prior art can in particular not be used for the determination of the stroke in valves having an electrodynamic actuator, as the electrodynamic actuator has a relatively small stroke, which cannot be detected in a reliable manner by the sensors known from the prior art.

Accordingly, there is a need for a diagnosis in a simple and cost-effective manner for a valve having an electrodynamic actuator.

SUMMARY

Embodiments of the present disclosure provide a method of diagnosing a valve having an electrodynamic actuator which comprises an, in particular stationary, coil, a movable magnet arrangement, in particular relative to the coil, for generating a magnetic field, and a movable control element, in particular relative to the coil, which is coupled to the movably arranged magnet arrangement. The method comprises the following steps:
- measuring at least one electrical variable of the electrodynamic actuator, and
- evaluating the electrical variable with respect to a reference variable to determine at least one induction-dependent valve variable which is assigned to the motion profile of the electrodynamic actuator.

The basic idea is to provide a diagnostic function for the valve by focusing on the at least one electrical variable of the electrodynamic actuator, i.e., the current and/or voltage used during operation of the electrodynamic actuator. The current flowing through the electrodynamic actuator, in particular the coil, or the voltage applied to the electrodynamic actuator, in particular the coil, is thus measured and correlated with a reference variable.

The reference variable is, for example, time, so that the electrical variable is measured over time to sense a corresponding time course of the electrical variable over a (continuous or uninterrupted) measurement period. This time course is then evaluated to thus determine a diagnosis of the valve, for example to define a condition of the valve. The electrical variable may also be measured at a single discrete measuring time or at several discrete measuring times. This allows the amount of data to be reduced accordingly.

For example, the electrical variable is measured in a time pattern such that the electrical variable is measured at the multiple discrete measuring times. The time pattern may be predetermined. The time pattern may also be manually adjustable or selectable.

The single discrete measuring time may be a significant point on a curve formed by the electrical variable and the reference variable, for example a maximum, a minimum or a summit of the curve.

According to the present disclosure, a direct evaluation of the time response of the electrical variable can thus be provided, as a result of which the at least one induction-dependent valve variable of the valve is determined, which is influenced by the movement of the electrodynamic actuator.

The measured electrical variable can also be evaluated with respect to another measured variable representing the reference variable. In particular, the measured electrical variable can be evaluated via the other measured variable, or vice versa, that is, the other measured variable can be evaluated via the measured electrical variable.

The other measured variable can also be measured. The other measured variable may be an electromagnetic variable.

For example, the other electrical variable is the interlinked flux, i.e., the total magnetic flux of the coil, which results from the integration of the magnetic flux density over the area formed by the coil together with the leads thereof.

Basically, the induction may depend on the speed of the movement of the moving magnet arrangement, and on the magnetic flux density. The coil constitutes an electrical conductor which generates a magnetic field when the electrodynamic actuator is driven, which interacts with the magnetic field of the magnet arrangement, which then moves, in particular perpendicularly to the magnetic field direction. In other words, the at least one induction-dependent valve variable assigned to the motion profile of the electrodynamic actuator can be determined by evaluating the electrical variable with respect to the reference variable, the time course, for example.

The coil can be stationary so that the magnet arrangement can move relative to the coil. Likewise, the control element coupled to the movably arranged magnet arrangement can then move relative to the stationary coil when the coil is energized.

Alternatively, it may be provided that both the magnet arrangement and the coil are movable, particularly relative to each other. In other words, neither the coil nor the magnet arrangement is stationary, so that both components of the electrodynamic actuator can move when the coil is energized.

In either case, the magnet arrangement is movable.

Accordingly, it is not necessary to use external sensors, for example displacement sensors, by means of which the movement of the actuator is detected, as is typically the case with electromagnetic actuators, which are also referred to as reluctance-based actuators. According to the present disclosure, it is not necessary, either, for a specially modulated signal to be used and evaluated to thus perform a diagnosis of the valve. Rather, according to the present disclosure, a valve variable assigned to the motion profile of the electrodynamic actuator can be determined via the corresponding behavior of the measurable electrical variable with respect to the reference variable.

By evaluating the behavior, in particular the time course of the at least one electrical variable, it is possible to derive the at least one valve variable, which contains information relevant for diagnoses. In contrast thereto, the sensors used with the electromagnetic actuators often only make it possible to determine whether a voltage intended for switching is present, but not whether the magnet armature has actually moved. If the magnet armature does not move, for example because it is tilted or stuck or the valve is clogged due to deposits, the valve will not switch with the electromagnetic actuator. Until now, this was not detected directly via the valve, but via an additional sensor system, for example an additional flow sensor.

According to the present disclosure, such states or diagnoses can be determined directly in the valve by evaluating the time course of the electrical variable of the electrodynamic actuator.

Accordingly, the corresponding evaluation is performed based on the measurement of the behavior of the electrical variable (current and/or voltage) occurring when the valve is switched, which is measured accordingly with respect to the reference variable, in particular the time, or another measured variable such as an electromagnetic variable.

One aspect provides that the electrical variable of the electrodynamic actuator is measured by means of a diagnosis module electrically inserted in an electric circuit of the coil of the electrodynamic actuator. The diagnosis module can therefore measure the current and/or voltage flowing through or applied to the electrodynamic actuator as the diagnosis module is inserted in the electric circuit.

The at least one valve variable may be a path traveled by the magnet arrangement, the duration of movement of the magnet arrangement, a speed profile of the magnet arrangement, and/or an acceleration profile of the magnet arrangement. In this respect, based on the behavior, in particular the time course, of the at least one electrical variable, corresponding motion parameters of the electrodynamic actuator can be determined, since these have an influence on the induction, which is accordingly measured electrically. In contrast thereto, in the case of reluctance actuators, no conclusions can be drawn about the path traveled or the speed of movement of the reluctance actuator.

According to a further aspect, when evaluating the electrical variable with respect to the reference variable, in particular the time course of the electrical variable, a reference is used, wherein a comparison is carried out, in particular wherein a difference is formed between the electrical variable with respect to the reference variable f and the reference. The reference may be a time reference course of the electrical variable. In this respect, the time course can be compared with the time reference course. Consequently, a difference can be formed between the time course and the time reference course. The time reference course is thus used to determine corresponding deviations in the operation of the valve, in particular of the electrodynamic actuator. This allows the valve variable to be determined unambiguously if the time course exhibits a characteristic deviation from the reference course. Alternatively, it is also possible to use a curve as a reference, which represents the behavior of the electrical variable with respect to the reference variable. Deviations in the operation of the valve can thus also be determined via the corresponding difference which can be determined by a comparison.

The influence of the induction can be determined when the difference in particular between the reference course and the measured course is formed, as a result of which the motion profile can be concluded accordingly. For this purpose, the reference course or reference is selected such that there is no induction, i.e., no movement of the magnet arrangement. In other words, the reference course or reference corresponds to a blocked or stuck magnet arrangement.

Therefore, if there is no difference, in particular between the measured course and the reference course, this would indicate a stuck or blocked magnet arrangement.

In particular, the electrical variable with respect to the reference variable, for example the time course of the electrical variable and the reference, for example the time reference course, together enclose a surface, the surface area and/or shape of which is determined or analyzed. The time course of the electrical variable, for example the current curve (over time), represents a measure of the speed of the electrodynamic actuator, in particular of the moving magnet arrangement, so that the integration over the time course corresponds to the path traveled by the magnet arrangement. In other words, the surface area thus represents the traveled path of the magnet arrangement. To determine the acceleration of the magnet arrangement, the measured time course of the electrical variable must be derived according to time. It is thus possible to determine the induction-dependent valve variable assigned to the motion profile of the electrodynamic actuator, in particular of the magnet arrangement.

It is basically possible to evaluate the shape of the behavior of the electrical variable with respect to the reference variable, for example the time course, i.e., independently of the reference, in particular the time reference course, to determine the at least one valve variable. Based on the shape, it is possible to infer, for example, a switching duration of the electrodynamic actuator, i.e., the duration of the movement of the magnet arrangement. The speed profile of the magnet arrangement can also be determined directly from the shape of the time course.

Furthermore, the reference, in particular the time reference course can be a previously measured electrical variable with respect to the reference variable, for example a previously measured time course of the electrical variable, an electrical variable calculated during the process with respect to the reference variable, in particular a time course of the electrical variable calculated during the process, or an approximately estimated electrical variable with respect to the reference variable, in particular an approximately estimated time course of the electrical variable. The previously measured time course corresponds to a previously recorded time course of the electrical variable, for example a previously recorded current course, which has been recorded under substantially similar ambient parameters, so that an influence of the ambient parameters is negligible.

It may also be provided that, when measuring the electrical variable, a corresponding calculation is performed by means of which the reference course is determined, which is related to the measured time course. A corresponding approximation can be carried out on the basis of the determined measurement data, so that the time reference course is an approximately estimated course.

For the approximation used as a reference course, a rectangular course can be assumed, so that the reference course corresponds to a rectangle.

In an analogous manner, the reference can have been determined in advance by measuring the electrical variable and relating it to the reference variable. Likewise, the electrical variable and/or the reference variable can be calculated or estimated during the process.

Basically, the time course of the electrical variable can first be evaluated mathematically to thus determine the at least one valve variable during the evaluation. For example, a mean final value of the measured electrical variable is first determined, which is then subtracted from the respective measured values of the electrical variable to obtain a modified time course of the electrical variable. The mean end value is a value of the measured electrical variable which no longer changes or only changes in a specific interval over a predefined time, so that it is assumed to be constant over the predefined time. Thus, at the mean final value, an end of the switching process or of the movement of the electrodynamic actuator is assumed. Subsequently, the values of the modified time course of the electrical variable can be divided by the mean final value, as a result of which the values thus obtained are independent of a resistance.

Finally, a surface below the corresponding curve can be determined, wherein the integral is both independent of time and independent of resistance.

The correspondingly determined surface may also be compared with a threshold value to determine whether the valve has actually switched or not. Thus, the state of the valve can be determined accordingly.

The electrical variable can also be measured over a measurement period or several discrete measuring times, the measured values being added up. A corresponding cumulative value is thus continuously calculated and temporarily stored in a memory, in particular in a ring buffer. The data stored in the ring buffer can be used to estimate the mean final value, for example as a moving average. The mean final value can thus still be determined, in particular estimated, during the measurement of the electrical variable.

Subsequently, a calculation of the surface below the corresponding curve can be performed as previously described, the determined surface being in turn compared with the threshold value to determine the position of the valve.

A further aspect provides that the determined valve variable is evaluated to determine at least one valve parameter of the valve. The valve parameter may be a coil temperature, a valve temperature, a pressure ratio in the valve, a state of a valve element actuated by the electrodynamic actuator, the type of valve element, a lifetime prediction of the valve element, a press-in depth of the valve element into an associated valve seat, and/or a correct fitting position of the valve element. The valve element may be a diaphragm. In this way, it can also be determined whether external disturbances such as pressure surges or cavitation are present, or whether there is friction in the driving system. Therefore, the previously determined valve variable is further evaluated to be able to provide at least one diagnostic function of the valve. Here, additional parameters can be used, for example the valve type, to determine, among other things, whether a media pressure presses the diaphragm or the valve element of the valve onto the valve seat or lifts it off the valve seat. In other words, the valve type has an influence on whether the media pressure assists or inhibits the lifting of the diaphragm or valve element from the valve seat. Ambient parameters, such as an ambient temperature can also be taken into account.

The lifetime of the diaphragm or the valve element can be predicted by comparing it with the reference course, since deviations from the reference course provide information about the state of the diaphragm or the valve element, which can be used to make a lifetime prediction.

Measurements taken when the valve is switched off can basically be used to determine the press-in depth of the diaphragm or the valve element into the valve seat. It is thus possible to infer the wear at this point, so that the beginning of the so-called "punching through" of the diaphragm or the valve element may possibly be detected.

Artificial intelligence, in particular a machine learning model can be used in the evaluation to determine the at least one valve parameter of the valve. In principle, the artificial intelligence may be an algorithm executed by a processor or a control and/or evaluation unit to determine the at least one valve parameter.

In particular, a machine learning module is provided which has a trained or taught machine learning model which receives the previously determined valve variable as an input parameter or is fed with the previously determined valve variable to determine the at least one valve parameter.

Embodiments of the present disclosure also provide a diagnosis module for a valve having an electrodynamic actuator comprising an, in particular stationary, coil, a movable magnet arrangement, in particular relative to the coil, for generating a magnetic field, and a movable control element, in particular relative to the coil, which is coupled to the movably arranged magnet arrangement. The diagnosis module is set up to perform a method of the type previously mentioned.

The diagnosis module may be a retrofit assembly into which the corresponding valve is subsequently coupled to provide the diagnostic function(s). The diagnosis module may be electrically connected into the electric circuit of the coil to sense the at least one electrical variable of the electrodynamic actuator.

According to the present disclosure, the object is furthermore achieved by a valve comprising a valve element, for example a diaphragm, an electrodynamic actuator coupled to the valve element, and a diagnosis module of the type mentioned above. The electrodynamic actuator may comprise an, in particular stationary, coil, a movable magnet arrangement, in particular relative to the coil, for generating a magnetic field, and a movable control element, in particular relative to the coil, which is coupled to the movably arranged magnet arrangement.

The valve is a microvalve. The microvalve has a correspondingly compact design.

In principle, the valve can initially be designed without a diagnosis module, the diagnosis module being subsequently integrated as an optional retrofit module. Diagnosis by means of the diagnosis module works for all valve types having an electrodynamic actuator.

The method and the diagnosis module thus provide an extension to enable corresponding diagnostic functions for a valve having an electrodynamic actuator.

In principle, the above-mentioned features and the associated advantages can be applied accordingly to the method, the diagnosis module and the valve.

BRIEF DESCRIPTION OF THE DRAWINGS

Further advantages and characteristic features of the embodiments of the present disclosure will become apparent from the description below and the drawings, to which reference is made and in which.

DETAILED DESCRIPTION OF THE INVENTION

Figure 1:
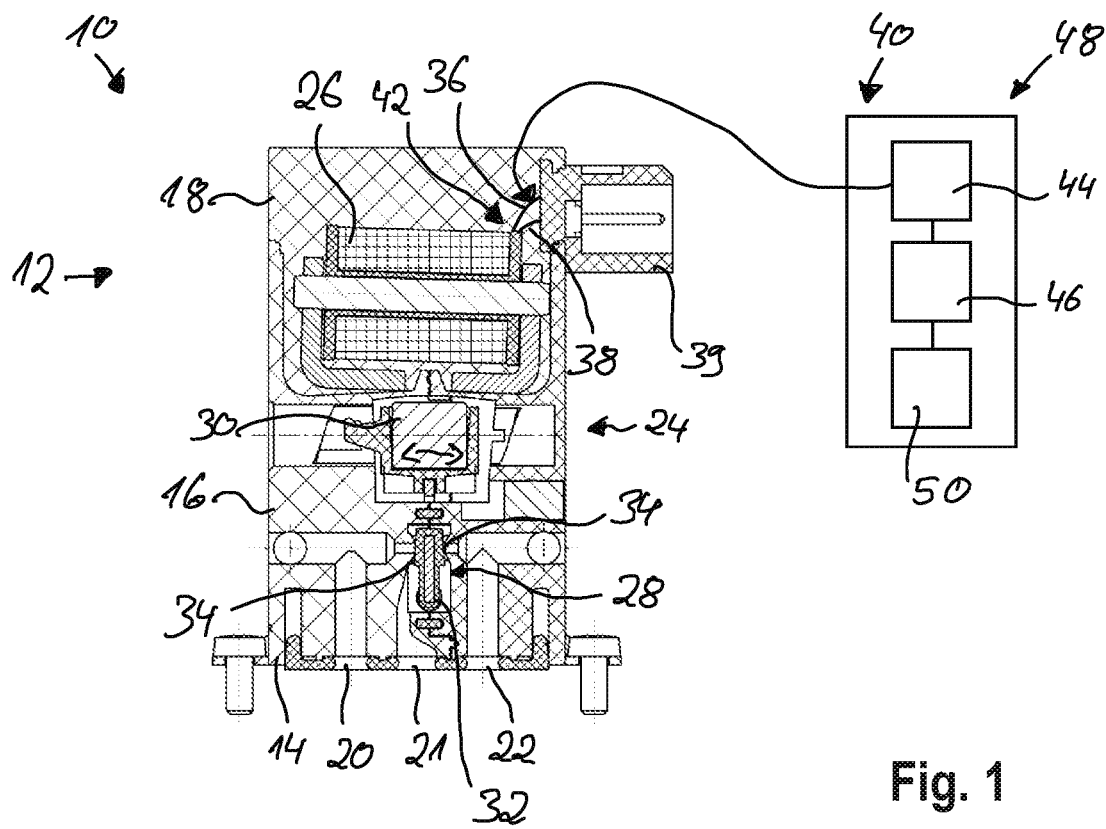
FIG. 1 shows a schematic representation of a valve according to an embodiment of the present disclosure with a diagnosis module according to an embodiment of the present disclosure.

FIG. 1 shows a valve 10 which has a housing 12 composed, for example, of a plurality of housing parts 14, 16, 18.

Three fluid connections 20, 21, 22 are formed on the housing 12, in particular the first housing part 14, via which a fluid can flow through the valve 10 and is accordingly processed by the valve 10.

To control the fluid to be processed, an electrodynamic actuator 24 is provided comprising a coil 26 which is stationary in the embodiment shown, and a control element 28 which is movable relative to the coil 26. In addition, the electrodynamic actuator 24 has a movable magnet arrangement 30, which is coupled to the control element 28. In this respect, the control element 28 and the magnet arrangement 30 move in common relative to the coil 26.

However, it is also possible that both the coil 26 and the magnet arrangement 30 are movable. Only the embodiment shown will however be further discussed below, in which the coil 26 is stationary and the magnet arrangement 30 is accordingly movable relative to the coil 26.

The movable magnet arrangement 30 generates a magnetic field which interacts with a magnetic field of the stationary coil 26, so that the magnet arrangement 30 moves due to the magnetic field generated by the coil 26, provided that the coil 26 is energized, i.e., a current is applied thereto. The movement of the coil 26 is transmitted to the movable control element 28 to adjust a valve element 32, for example a diaphragm coupled to the control element 28, which allows the fluid flow across the fluid connections 20, 22 to be adjusted.

To this end, the valve element 32 cooperates with at least one valve seat 34 of the valve 10, which is formed in the housing 12. Two valve seats 34 may also be provided which are assigned to the different end positions of the valve element 32.

In the embodiment of the valve 10 shown, the valve element 32 is arranged in the second housing part 16.

The second housing part 16 together with the third housing part 18 receives the electrodynamic actuator 24, so that these two housing parts 16, 18 together form the actuator housing.

In addition, the valve 10 includes electrical connections 36, 38 via which the electrodynamic actuator 24 is supplied with a voltage to initiate the corresponding movement of the control element 28 or the valve element 32 connected thereto in that a current flows through the coil 26, as a result of which a magnetic field is generated which cooperates with that of the magnet arrangement 30. The connections 36, 38 are provided on a plug or a socket 39 provided on the housing 12, namely on the third housing part 18.

In the embodiment shown in FIG. 1, the valve 10 includes a diagnosis module 40 which is integrated into an electric circuit 42 of the coil 26 or of the electrodynamic actuator 24, as shown schematically.

The integration into the electric circuit 42 can be carried out via the plug or socket 39, or via a separate interface which enables the integration of the diagnosis module 40 into the electric circuit 42 of the coil 26 or the electrodynamic actuator 24.

The diagnosis module 40 is basically configured to measure an electrical variable of the electrodynamic actuator 24. The electrical variable may be a current and/or a voltage, so that the time course of the corresponding electrical variable can be measured over a continuous measurement period to record the time course of the electrical variable, for example a current course or a current curve. The electrical variable can also be measured at several discrete measuring times to reduce the amount of data accordingly. This can however also be used to determine a time course of the electrical variable. It is also possible that the electrical variable is measured at only one discrete measuring time which is significant, for example.

In general, the time course of the electrical variable is the electrical with respect to a reference variable, namely time as the reference variable. Accordingly, the time course of the electrical variable represents a curve, namely of the electrical variable over time.

For measuring the electrical variable, the diagnosis module 40 includes a measuring module 44 which measures the corresponding electrical variable of the electrodynamic actuator 24.

The measured electrical variable can be transmitted from the measurement module 44 to a computing module 46 of the diagnosis module 40, which performs a corresponding calculation based on the measured electrical variable, so as to perform an evaluation of the time course of the electrical variable.

The computing module 46 may be part of a higher-level control and/or evaluation unit 48, in particular of the entire valve 10, provided that the diagnosis module 40 is integrated in the valve 10.

However, in the embodiment shown, the diagnosis module 40 is designed separately, since it is a retrofit module which was subsequently integrated into the existing electric circuit 42 to add the appropriate diagnostic functionality to the valve 10.

In the embodiment shown, the diagnosis module 40 also comprises an output module 50 via which the measured electrical variable and/or a variable determined based thereon can be output so that it can be displayed to a user of the valve 10. The output module 50 may be a display.

In principle, the diagnosis module 40 thus serves to detect and evaluate a state of the valve 10 or of the electrodynamic actuator 24 to determine a diagnostic function. To this end, as already explained, the diagnosis module 40 focusses on a correspondingly measured electrical variable of the electrodynamic actuator 24, for example the current.

Figure 2:
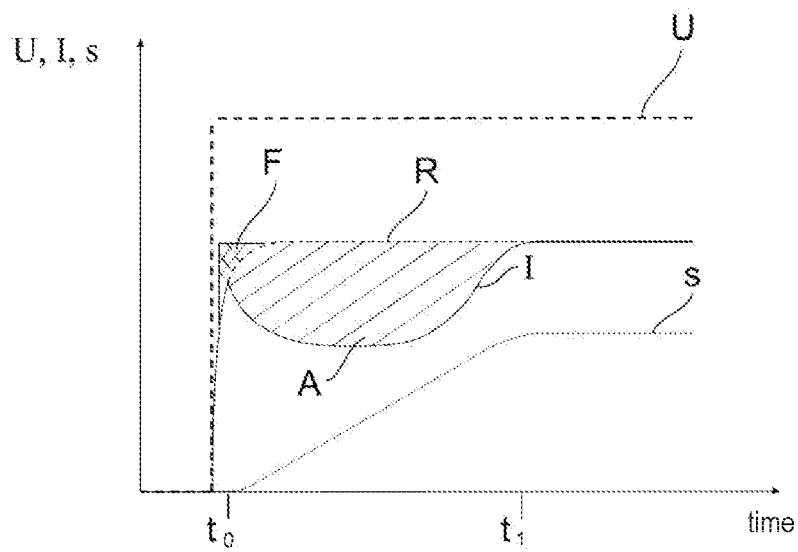
FIG. 2 shows a diagram showing a time course of a measured electrical variable and a time reference course.

FIG. 2 shows a diagram showing the electrical variables detected by the diagnosis module 40 over a measurement period, the corresponding time course of the electrical variables being represented.

The measured electrical variables are the voltage U applied to the electrodynamic actuator 24 and the current I flowing through the electrodynamic actuator 24, in particular the coil 26. The voltage U is shown as a dashed line, whereas the current I is shown as a solid line in the diagram.

Furthermore, FIG. 2 shows a time reference course R, which is also shown as a dashed line. The time reference course R represents a reference for the current course that would occur with a blocked or stuck magnet arrangement 30, i.e., with no movement of the magnet arrangement 30.

It is apparent from FIG. 2 that the time course of the current I deviates from the time reference course R in a time period which lies between t0 and t1, which corresponds to an evaluation period.

The current course, i.e., the time course of the electrical variable of the current I, therefore collapses at time t0 relative to the reference course R, with the current course reaching its final value at time t1, which corresponds to that of the time reference course R.

The dip in the measured current course I is accompanied by a movement of the electrodynamic actuator 24, as is also apparent from FIG. 2, in that the path s of the magnet arrangement 30 over time is additionally represented.

In this respect, the measured current at time t1 again corresponds to the current value of the reference course R, since the movement of the magnet arrangement 30 has ended at this time.

Basically, the shape of the dip, i.e. the deviation of the measured time course of the electrical variable (current course) from the time reference course R, depends on the speed of the magnet arrangement 30, so that when the time course of the current I is evaluated over the evaluation period, at least one induction-dependent valve variable of the valve 10 can be determined, which is assigned to the motion profile of the electrodynamic actuator 24.

As explained above, the induction-dependent valve variable may be the travelled path s of the magnet arrangement 30. It may also be the duration of the movement of the magnet arrangement 30, a speed profile of the magnet arrangement 30, and/or an acceleration profile of the magnet arrangement 30. For this purpose, the shape of the current course is analyzed accordingly during evaluation to conclude the duration of the movement, the speed profile and/or the acceleration profile of the magnet arrangement 30.

The reference course R, with which the measured time course of the electrical variable I is compared, may be a previously measured time course, for example with a blocked magnet arrangement 30, or a course calculated during the process.

A correspondingly approximated course may also be used as an approximation, as is also shown in FIG. 2, in that a rectangular course or a corresponding rectangle having a cross-hatched surface F as an error is assumed approximately.

Irrespective of the nature of the reference course, i.e., how it takes place, the difference between the time course of the electrical variable, i.e., the current course I, and the time reference course R can be used to determine how and whether the magnet arrangement 30 of the electrodynamic actuator 24 has moved upon actuation of the electrodynamic actuator 24. In other words, it is possible to determine the motion profile of the electrodynamic actuator 24.

To this end, the surface A enclosed between the time course of the electrical variable I and the reference course R can be taken into account, the surface area being determined and/or the shape of the enclosed surface being analyzed, as already explained above, to infer the valve variable.

This can be done accordingly in the diagnosis module 40, in particular in the integrated computing module 46.

Basically, when the coil 26 is energized, the coil 26 generates a magnetic field which interacts with the magnetic field of the movable magnet arrangement 30, thereby exerting a corresponding electromagnetic force on the movable magnet arrangement 30 which causes the magnet arrangement 30 to move. The movement of the magnet arrangement 30 is transmitted to the control element 28 due to the coupling thereto, as a result of which the position of the valve element 32, which is in turn coupled to the control element 28, changes.

As the speed of the movement of the magnet arrangement 30 and the magnetic flux density have an influence on the induction, this can be detected accordingly by the diagnosis module 40, wherein the diagnosis module 40 evaluates the time course of the electrical variable of the electrodynamic actuator 24, for example the current course.

The measured current curve, i.e., the time course of the electrical variable provided as current, can then be subtracted from a current curve without movement, i.e., with a blocked magnet arrangement 30, the latter corresponding to the reference course R. Only the fraction caused by the induction remains.

This fraction caused by the induction has the surface area of the surface A, as shown in FIG. 2, the size of the surface A and the shape of the surface A being adapted to be analyzed to thus determine the induction-dependent valve variable assigned to the motion profile of the electrodynamic actuator 24, in particular the magnet arrangement 30.

The surface area of the surface A corresponds to the path s travelled by the magnet arrangement 30, which in turn can be used to infer a valve stroke of the valve 10 with the electrodynamic actuator 24.

For this purpose, a corresponding normalization must take place to assign the path s of the magnet arrangement 30 to the valve stroke of the valve 10. This can be done by means of a corresponding normalization. To assign the path s of the magnet arrangement 30 to the stroke of the valve 10, the measured electrical variable of the electrodynamic actuator 24 is normalized to the valve 10.

For this purpose, the respectively determined final value can be used for normalization, or the maximum stroke in relation to the (maximum) surface A can be stored for each valve 10. For example, the maximum stroke is specified as a travel, i.e., in "mm", or as a degree of opening, i.e., in "%". It is also possible to define a limit or threshold value above which the valve 10 is considered "open". In addition to the normalization to the maximum stroke of the valve 10, the geometry of the entire valve drive is also taken into account.

Figure 3:
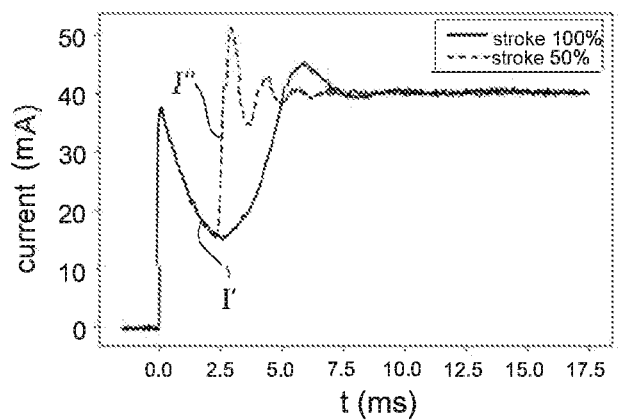
FIG. 3 shows a diagram showing two different time courses of a measured electrical variable for different motion profiles of the electrodynamic actuator.

FIG. 3 shows that the time course of the electrical variable, i.e., the current curve, can also be evaluated independently of the reference course R to draw conclusions about a corresponding valve variable.

FIG. 3 in particular shows a diagram showing two time courses I', I" of the electrical variable provided as a current for a fully open valve 10 (100%) and a half-open valve 10 (50%), based on the stroke of the valve 10.

FIG. 3 clearly shows that the two time courses of the measured electrical variable differ from each other, as a result of which the degree of opening of the valve 10 can be concluded accordingly.

In this respect, the corresponding profile, i.e., the speed and the time, can be used to draw conclusions about the force equilibrium prevailing at the valve 10 at the respective time.

As explained above, a rectangle can be assumed approximately as the reference course to thus determine a surface which indicates the induction-related fraction. This can be used to determine the path s of the magnet arrangement 30, from which the stroke can be deduced, as already described above.

Figure 4:
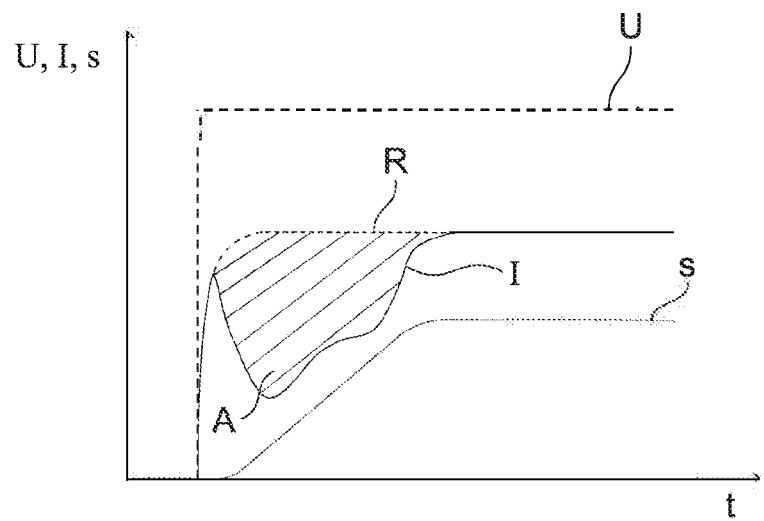
FIG. 4 shows a diagram showing the time course of a measured electrical variable and a time reference course for a valve according to one embodiment.
Figure 5:
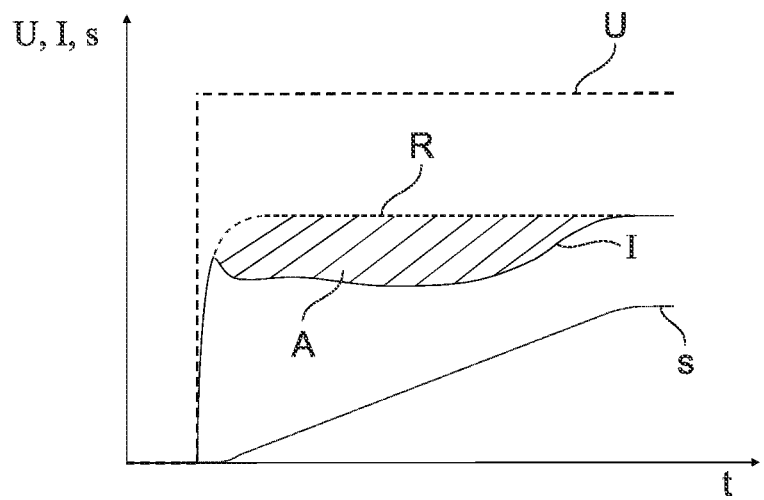
FIG. 5 shows a diagram showing the time course of a measured electrical variable and a time reference course for a valve according to another embodiment.

FIGS. 4 and 5 show two further diagrams for corresponding time courses of the electrical variable provided as current, i.e., the current curves I, which differ from each other. Also shown in both diagrams are the voltage U, the path s of the magnet arrangement 30, the time reference course R, and the surface A.

The example embodiment shown in FIG. 4 involves a valve 10, the valve seat 34 of which is impinged by a flow from below, which is also referred to as "bottom-seat impingement". In this case, a medium pressure is exerted on the valve element 32, in particular the diaphragm, which is why the pressure of the medium supports the opening movement when the valve 10 opens, as can be seen from the shape of the time course of the measured electrical variable.

In contrast thereto, FIG. 5 shows that the valve element 32, in particular the diaphragm is impinged by a flow from above, which is also referred to as "top-seat impingement", which makes it more difficult to open the valve element 32, as it must be moved against the pressure of the medium when opening, which correspondingly increases the switching time.

This can be clearly seen from a comparison of the time courses shown in FIGS. 4 and 5, in particular their shapes, which are evaluated accordingly by the diagnosis module 40.

In FIG. 4, the "dip" in the current course I at the beginning of the movement can be clearly seen, in particular more strongly than in the current course I in FIG. 5. In contrast thereto, the magnet arrangement 30 in the example according to FIG. 5 moves much more slowly, which increases the switching time, as the valve element 32 must work against the medium pressure.

The surface areas of the surfaces A enclosed by the respective current course I and the reference course R are equal in size, since the valve 10 or the electrodynamic actuator 24 is completely moved. However, the surfaces A differ in shape, as can be seen from FIGS. 4 and 5.

The different shape results from different current courses I. The current course is influenced, among other things, by pressure, direction of flow, temperature (medium, environment, valve) and viscosity of the medium and diaphragm material or state of the valve element 32 or diaphragm. In this respect, these variables can be derived as valve variables from the current course I or determined during evaluation.

Figure 6:
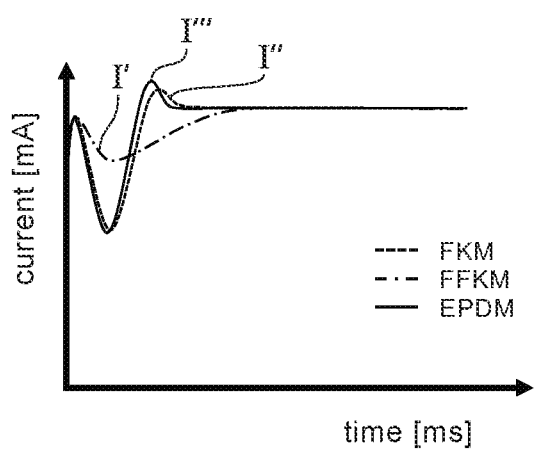
FIG. 6 shows a diagram showing the time courses of a measured electrical variable for three different diaphragm materials.

FIG. 6 shows three different time current courses I', I", I"', which have been measured for three different materials of the valve element 32 configured as a diaphragm, namely for a fluoro-rubber (FKM), a perfluoro-rubber (FFKM) and an ethylene-propylene-diene (monomer) rubber (EPDM). The different materials of the diaphragm 32 can be clearly distinguished from each other on the basis of the current courses I', I", I"'. In this respect, it is also possible to deduce the type of valve element 32, in particular the material type, by evaluating the time course of the electrical variable, for example the current course. In this case, it can also be determined whether the correct valve element 32 has been installed in the respective valve 10.

Figure 7:
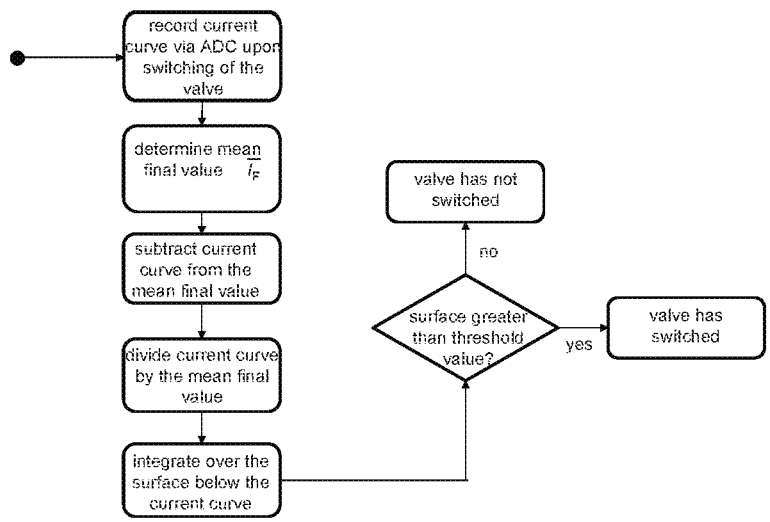
FIG. 7 shows a flow chart illustrating a method according to the present disclosure in accordance with a first variant embodiment.

FIG. 7 shows a flow chart illustrating the method of diagnosing the valve 10 according to a first variant embodiment.

First, the electrical variable of the electrodynamic actuator 24 is measured over a measurement period by the diagnosis module 40, in particular the measurement module 44, to sense a time course of the electrical variable. Accordingly, the values of the electrical variable may be stored in a digital format via an analog-to-digital converter (ADC).

The measured values of the electrical variable are stored, thus providing the current course, i.e., the time course of the electrical variable. The measurement period may be 200 milliseconds, the latter being selected such that the switching operation of the valve 10 is also completed at the end of the measurement period. The measurement period can be adapted or adjusted accordingly, depending on the ambient parameters, for example at low temperature or at high pressure of the medium.

Figure 8:
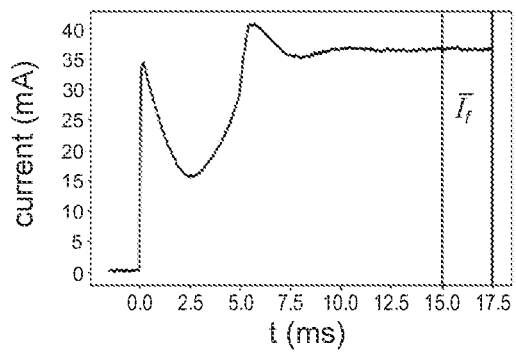
FIG. 8 shows a diagram showing a time course of an electrical variable measured according to the method according to FIG. 7.

FIG. 8 shows the second step of the method according to FIG. 7 in a detailed manner, in which the measured time course of the electrical variable is processed by the diagnosis module 40, in particular the computing module 46 to determine a mean final value $I_f$.

This may be the case when the measured value of the electrical variable does not change or changes only insignificantly over a predefined period of time, for example by less than a defined percentage value, in particular 5%. If this condition occurs, a point in time and an assigned final value of the electrical variable are fixed.

Figure 9:
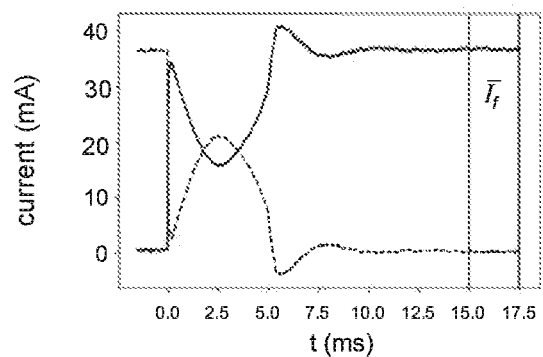
FIG. 9 shows a diagram showing the time course according to FIG. 8 and a modified time course based on the time course according to FIG. 8.

FIG. 9 shows the third step of the method according to FIG. 7 in a detailed manner, according to which the previously determined mean final value $I_f$ is respectively subtracted from the values of the measured electrical variable such that a modified time course of the electrical variable is generated which is additionally represented in a dashed form in FIG. 9.

Figure 10:
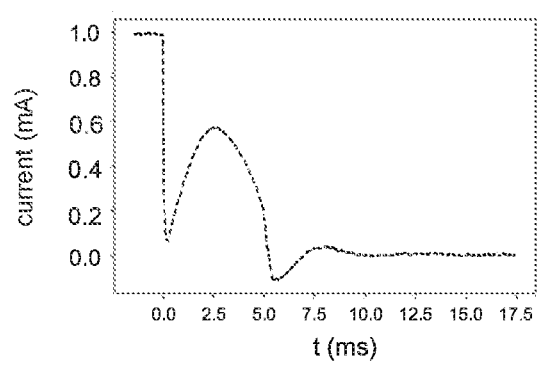
FIG. 10 shows a diagram showing a normalized time course of the electrical variable based on the modified time course according to FIG. 9.

The modified time course of the electrical variable is further processed in the computing module 46 of the diagnosis module 40 in that the corresponding current curve is divided by the previously determined mean final value I, such that a normalized time course of the electrical variable is present, as is clearly apparent from FIG. 10. The values resulting therefrom are independent of any resistance in the measurement setup.

It is then possible to determine the surface below the normalized curve by a corresponding integration thereof. The integral thus obtained is time-independent and independent of the resistance.

This allows the corresponding induction-dependent valve variable to be determined, namely the path of the magnet arrangement 30 or the stroke of the valve 10.

If the calculated surface is greater than a predefined threshold value, it can be determined whether the valve 10 has switched or not. This corresponds to the valve parameter of the valve 10, which can be evaluated based on the previously determined valve variable.

Figure 11:
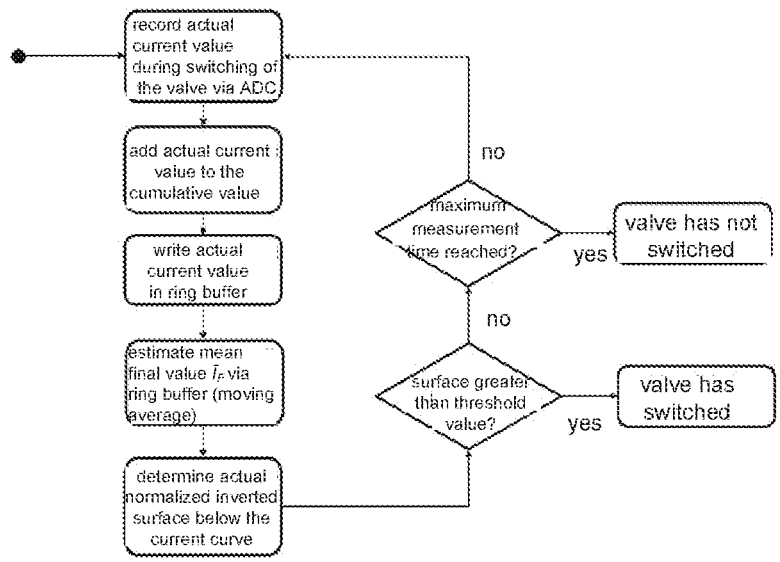
FIG. 11 shows a flow chart showing a method according to the present disclosure in accordance with a second variant embodiment.

FIG. 11 shows a second embodiment in which the evaluation of the time course of the electrical variable takes place during the movement of the magnet arrangement 30, already after 15 milliseconds, for example.

It is thus possible to determine correspondingly more quickly whether a switching operation has taken place or not.

The electrical variable is measured over a measurement period or several discrete measuring times, for example, the measured values being summed up.

A corresponding cumulative value is calculated continuously and temporarily stored in a memory of the diagnosis module 40, in particular in a ring buffer.

The data stored in the ring buffer can be used to estimate the mean final value $I_f$ as a moving average, for example. It is thus possible to determine, in particular to estimate the mean final value $I_f$ still during the measurement of the electrical variable.

A calculation of the surface below the corresponding curve can then take place as previously described, the determined surface being in turn compared with the threshold value to determine the position of the valve 10.

The diagnosis module 40 may comprise artificial intelligence which is provided in the computing module 46, for example.

The artificial intelligence involves, for example, a machine learning model which has previously been trained appropriately to determine at least one valve parameter of the valve 10 on the basis of the valve variable.

In principle, the valve parameter may be a coil temperature, a valve temperature, a pressure ratio in the valve 10, a state of the valve element 32 actuated by the electrodynamic actuator 24, the type of valve element 32, a lifetime prediction of the valve element 32, a press-in depth of the valve element 32 into the assigned valve seat 34 and/or a correct fitting position of the valve element 32, the valve element 32 being in particular configured as a diaphragm.

The diagnostic function can also be used for process monitoring. In a "stable process," first the reference course R is recorded. In the ongoing operation, corresponding time courses of the electrical variable can be measured and compared with the stored reference course R to thus detect changes. It is thus possible to monitor all influence factors affecting the course of the electrical variable.

It is additionally possible to determine very precise information as to the valve opening over time. In highly precise doser applications, the dosed quantity can thus be defined very accurately. This can be done in an absolute manner (in combination with other process values) or relative to previous dosing processes which thus serve as reference courses R.

It is furthermore possible to set up a closed control loop to allow a current curve to be traversed always in the same way and thus to keep the dosing quality stable in the long term, irrespective of any aging effects which may occur in the valve 10.

Figure 12:
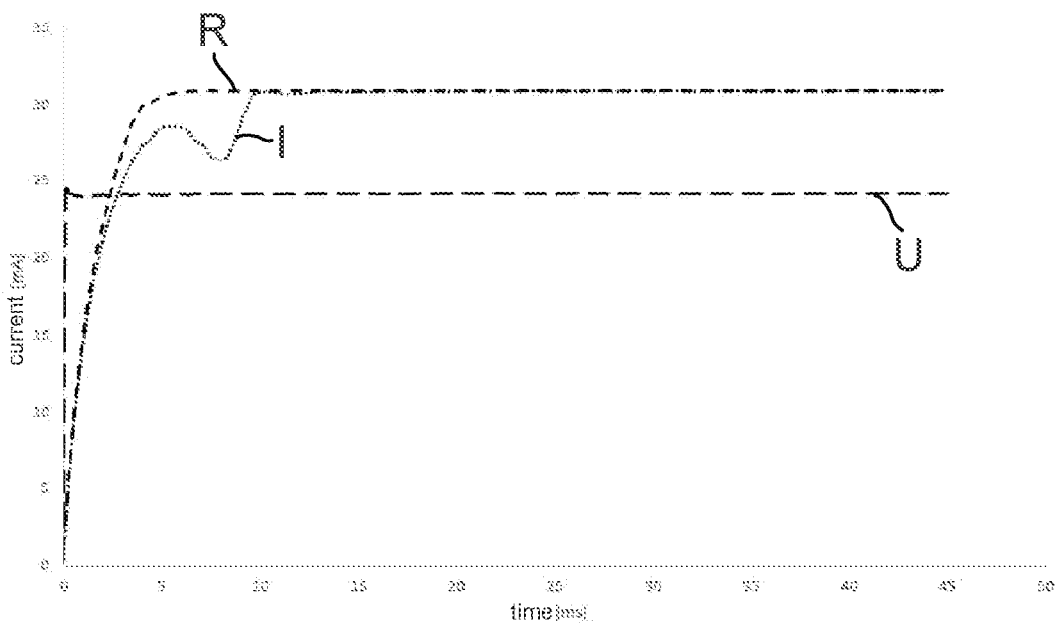
FIG. 12 shows a further diagram showing the time course of a measured electrical variable and a time reference course for a valve according to a further embodiment.

FIG. 12 shows a further diagram showing the electrical variables detected by the diagnosis module 40 over a measurement period in a further embodiment, the corresponding time course of the electrical variables being represented.

The measured electrical variables are the voltage U applied to the electrodynamic actuator 24 and the current I flowing through the electrodynamic actuator 24, in particular the coil 26. The time reference course R is furthermore represented.

The time reference course R represents a reference for the current course that would occur with a blocked or stuck magnet arrangement 30, i.e., with no movement of the magnet arrangement 30.

It is also apparent from FIG. 12 that the time course of the current I deviates from the time reference course R in a time period which lies between t0 and t1, which corresponds to an evaluation period.

The current course, i.e., the time course of the electrical variable of the current I, therefore collapses at time t0 relative to the reference course R, with the current course reaching its final value at time t1, which corresponds to that of the time reference course R.

The dip in the measured current course I is accompanied by a movement of the electrodynamic actuator 24.

In this respect, the measured current at time t1 again corresponds to the current value of the reference course R, since the movement of the magnet arrangement 30 has ended at this time.

Figure 13:
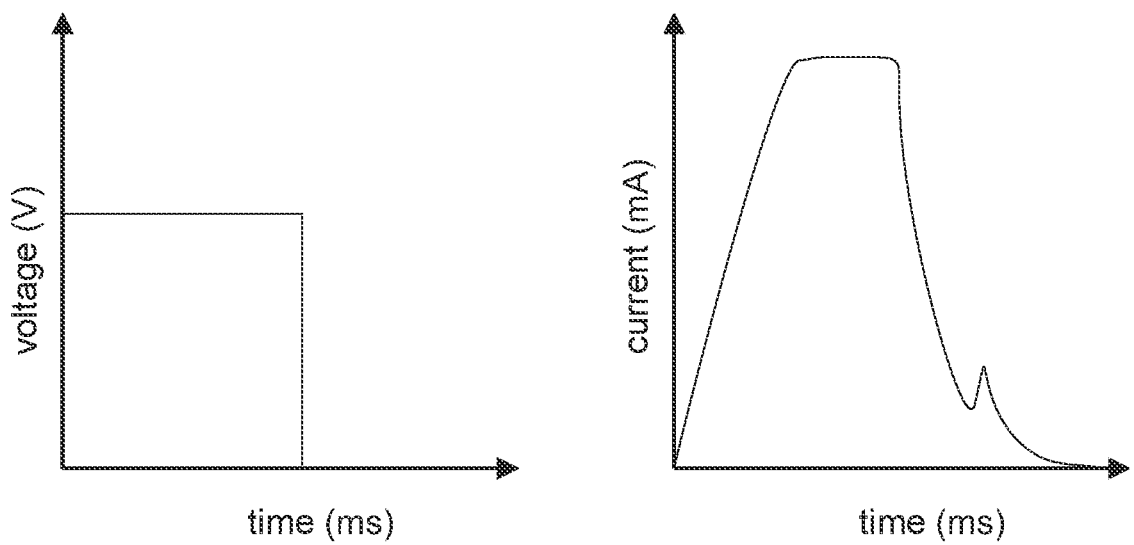
FIG. 13 shows an overview showing the measured electrical variables voltage and current over time for a further embodiment of a valve.

FIG. 13 shows an overview of the measured electrical variables voltage and current of an electrodynamic actuator of another valve, which have been measured over a measurement period. In this respect, the time courses of the respective electrical variables are shown in FIG. 13.

Figure 14:
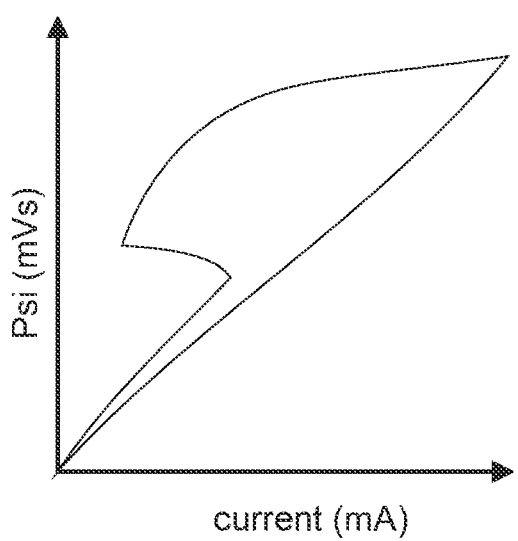
FIG. 14 shows a diagram showing the measured electrical variable, the time course of which is shown in FIG. 13, with respect to a reference variable of the interlinked flux.

In contrast thereto, FIG. 14 shows an overview in which the measured electrical variable, the time course of which is shown in FIG. 13, is represented in relation to a reference variable other than time, namely in relation to the interlinked flux ("Psi"). Specifically, the interlinked flux ("Psi") is represented via the measured electrical variable in the form of the current ("I"), the resulting curve being adapted to be evaluated accordingly, for example the course, the shape and/or the magnitude of the curve.

The evaluation can be carried out in an analogous manner to the previously explained examples, in that a reference is used with which the corresponding curve is compared, for example to identify deviations.

In particular, a surface can be enclosed by the curve, i.e., the electrical variable with respect to the reference variable, and the reference (curve), the surface area and/or shape of which is determined or analyzed to determine the at least one induction-dependent valve variable assigned the motion profile of the electrodynamic actuator.

As already explained above, the reference (curve) as well as the time reference course can be determined in advance (empirically), calculated during the process, or estimated approximately.

Basically, the shape of the dip, i.e. the deviation of the measured time course of the electrical variable (current course) from the time reference course R, depends on the speed/acceleration of the magnet arrangement 30, so that when the time course of the current I is evaluated over the evaluation period, at least one induction-dependent valve variable of the valve 10 can be determined, which is assigned to the motion profile of the electrodynamic actuator 24.

In this respect, it is possible according to the present disclosure to determine at least one induction-dependent valve variable which is assigned to the motion profile of the electrodynamic actuator 24 by evaluating the time course of the electrical variable of the electrodynamic actuator 24. Therefore, appropriate diagnostic functions of the valve 10 are possible in a simple and cost-effective manner, and are in particular retrofittable.

The invention claimed is:

1. A method of diagnosing a valve having an electrodynamic actuator, which comprises a coil, a movable magnet arrangement for generating a magnetic field, and a movable control element which is coupled to the movably arranged magnet arrangement, the method comprising the following steps:
measuring at least one electrical variable of the electrodynamic actuator by means of a diagnosis module which is electrically inserted into an electric circuit of the coil of the electrodynamic actuator, and
evaluating the electrical variable with respect to a reference variable to determine at least one induction-dependent valve variable which is assigned to a motion profile of the electrodynamic actuator,
wherein the coil is stationary in the electrodynamic actuator and the magnet arrangement is moveable relative to the coil.

2. The method according to claim 1, wherein the at least one valve variable is a travelled path of the magnet arrangement, a duration of a movement of the magnet arrangement, a speed profile of the magnet arrangement, and/or an acceleration profile of the magnet arrangement.

3. The method according to claim 1, wherein when evaluating the electrical variable with respect to the reference variable, a reference is used, a comparison being carried out.

4. The method according to claim 3, wherein a difference is formed between the electrical variable with respect to the reference variable and the reference.

5. The method according to claim 3, wherein the electrical variable with respect to the reference variable and the reference together enclose a surface (A), a surface area and/or a shape of which is determined or analyzed.

6. The method according to claim 3, wherein a time course of the electrical variable and a time reference course (R) together enclose a surface (A), a surface area and/or a shape of which is determined or analyzed.

7. The method according to claim 3, wherein the reference is a previously measured electrical variable with respect to the reference variable, an electrical variable calculated during the process with respect to the reference variable, or an approximately estimated electrical variable with respect to the reference variable.

8. The method according to claim 1, wherein the determined valve variable is evaluated to define at least one valve parameter of the valve.

9. The method according to claim 8, wherein the at least one valve parameter of the valve is a coil temperature, a valve temperature, pressure ratios in the valve, a state of a valve element actuated by the electrodynamic actuator, a type of valve element, a lifetime prediction of the valve element, a press-in depth of the valve element into an assigned valve seat, and/or a correct fitting position of the valve element.

10. The method according to claim 8, wherein an artificial intelligence is used in the evaluation to define the at least one valve parameter of the valve.

11. The method according to claim 10, wherein the artificial intelligence is a machine learning model.

12. The method according to claim 1, wherein the electrical variable is a variable for controlling the actuator.

13. The method according to claim 1, wherein the control element is movable with respect to the coil.

14. A diagnosis module for a valve having an electrodynamic actuator which comprises a coil, a movable magnet arrangement for generating a magnetic field, and a movable control element which is coupled to the movably arranged magnet arrangement, wherein the diagnosis module is set up so as to perform a method according to claim 1.

15. A valve having a valve element, an electrodynamic actuator coupled to the valve element, and a diagnosis module according to claim 14.

* * * * *